United States Patent [19]

Yascheritsyn et al.

[11] 4,178,818

[45] Dec. 18, 1979

[54] METHOD OF CUTTING SOLIDS OF REVOLUTION BY A ROTARY TOOL HAVING CIRCULAR CUTTING LIP, AND A ROTARY TOOL FOR CARRYING SAME INTO EFFECT

[75] Inventors: Petr I. Yascheritsyn; Alexandr V. Borisenko; Valery A. Sidorenko; Evgeny A. Serebryakov, all of Minsk, U.S.S.R.

[73] Assignee: Fiziko-Tekhnichesky Institut Akademii Nauk Belorusskoi SSR, U.S.S.R.

[21] Appl. No.: 897,020

[22] Filed: Apr. 17, 1978

[30] Foreign Application Priority Data

Apr. 19, 1977 [SU] U.S.S.R. .............................. 2475943

[51] Int. Cl.² ...................... B23B 29/00; B23B 3/00; B26D 1/12
[52] U.S. Cl. ..................................... 82/36 R; 82/1 C; 407/7; 407/11
[58] Field of Search .............. 407/7, 11; 82/1 L, 36 R

[56] References Cited

U.S. PATENT DOCUMENTS

| 307,227 | 10/1884 | Richards | 82/36 R |
|---|---|---|---|
| 1,735,841 | 11/1929 | Von Neudeck | 407/11 |
| 2,230,455 | 2/1941 | Githens | 407/11 |
| 2,551,167 | 5/1951 | Rolland | 407/7 |
| 2,885,766 | 5/1959 | Ernst et al. | 407/7 |

Primary Examiner—Harrison L. Hinson
Attorney, Agent, or Firm—Robert E. Burns; Emmanuel J. Lobato; Bruce L. Adams

[57] ABSTRACT

The herein-proposed method of cutting solids of revolution by a rotary tool having circular cutting lip resides in that the tool is imparted feed motion, while its rotation results from the interaction of said tool with the rotating workpiece being machined. Prior to bringing the tool in contact with the surface being machined the tool is imparted a positive rotation at a speed differing by not more than 20 percent from the tool working speed, in the same direction as the tool working motion. The rotary tool for carrying said method into effect is shaped as a solid of revolution having a circular cutting lip and held on a spindle provided with a through center bore for the stream of coolant to feed therethrough, the screw-type wind turbine being provided in said spindle bore.

1 Claim, 1 Drawing Figure

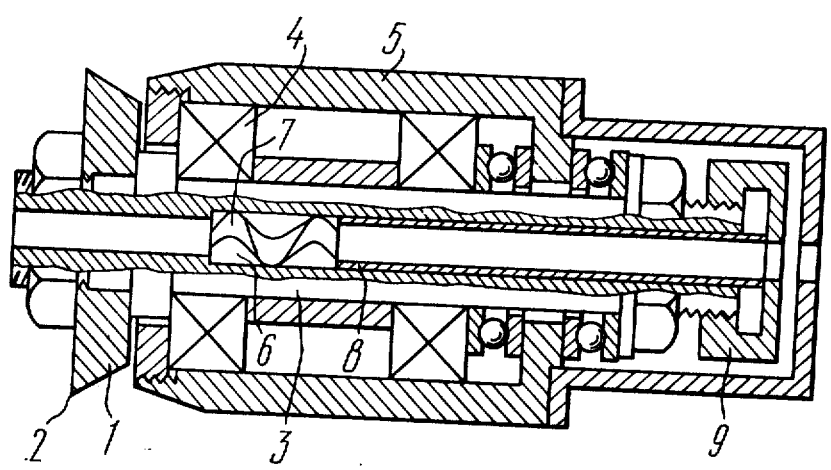

METHOD OF CUTTING SOLIDS OF REVOLUTION BY A ROTARY TOOL HAVING CIRCULAR CUTTING LIP, AND A ROTARY TOOL FOR CARRYING SAME INTO EFFECT

The present invention relates generally to mechanical chip-removal treatment of materials and concerns particularly some methods of cutting solids of revolution by a rotary tool having a circular cutting lip, and rotary tools for carrying said method into effect.

The invention can be used to the best advantage when cutting workpieces with discontinuous surfaces.

It is extensively known at present to use some methods of cutting solids of revolution by rotary tools having a circular cutting lip, and some rotary tools for carrying said methods into effect. According to the known method of cutting solids of revolution the tool is imparted feed motion, while its rotation results from the interaction of the tool and the rotating workpiece being machined. A rotary tool is also known to comprise its working portion shaped as a solid of revolution having a circular cutting lip and being held in place on a spindle provided with a through centre bore adapted for a coolant stream to feed therethrough. The efficiency of said method to a great extent depends upon the stability of the tool cutting speed which is set automatically as a result of interaction of the tool cutting surfaces with the surface being machined to correspond to minimum speeds of the relative portion effective in the zones of contact of the tool and the workpiece. To attain stable tool rotation during the cutting process it is necessary that the period of a continuous tool-to-workpiece contact be long enough for the tool to accelerate. However, when machining discontinuous surfaces the stability of the tool rotation process is disturbed, i.e., tool rotation ceases at the intervals between the portions of the surface being machined so that a motionless tool comes every time in contact with the surface being machined. Inasmuch as metal removing rates in case of rotary cutting are 2 to 5 times the speed of conventional metal cutting, a motionless tool undergoes dynamic impact and thermal shock every time it comes in contact with the material being machined, with the result that the cutting lip chips out prematurely and thus gets badly worn out. Similar event occurs in machining continuous surfaces at the instance of an initial contact of a motionless tool with the material to be machined.

The tool angular velocity, at such high speeds that are characteristic of the rotary cutting process, when the tool passes the continuous surface being machined, fails to reach its optimum values, whereas the surface portions machined by a tool at the acceleration stage prove to be substantially worse, as to the surface finish and machining accuracy characteristics, than the surface portions machined by a tool having stable rotational speed. This is accounted for by the fact that the tool rotational speed influences practically every particulars of the cutting process, that is, kinematic, cutting-force, temperature, deformation, which inevitably results in patchiness of the machined surface, as well as inadequacy of such characteristics as the height of microirregularities, degree and depth of skin-hardening, amount of residual stresses, etc. Thus, for instance, when machining the rotors of turbines or electrical machines provided with surface slots to accommodate bars, where the slots take up from 20 to 50 percent of the surface of the component and their number amounts to a few scores, using a rotary tool which receives rotation only as a result of its contact with the workpiece, the tool while passing along the slot, is substantially decelerated, or its rotation ceases at all. As a result the quality of surface finish in the places of tool contact with the workpiece is badly affected, departure from true geometrical shape occurs, as well as chipped out spots both on the workpiece and the tool.

It is an object of the present invention to improve the quality of surface finish of the workpieces being machined and attain higher dimensional accuracy thereof.

It is another object of the present invention to attain higher tool endurance.

The essence of the invention resides in the fact that in a method of cutting solids of revolution by a rotary tool having a circular cutting lip, wherein the tool is imparted feed motion, while its rotation in the cutting process results from the interaction thereof with the workpiece being machined, according to the invention, prior to being brought in contact with the surface being machined the tool is imparted a positive rotation in the direction of the tool working motion at a speed differing by not more than 20 percent from the tool speed resulting from its contact with the workiece being machined.

The essence of the invention resides also in that in a rotary tool for carrying the herein-proposed method into effect, having its working portion shaped as a solid of revolution with a circular cutting lip and held in place on a spindle, wherein a through centre bore is provided for the coolant stream to feed therethrough, according to the invention a screw-type wind turbine is located in the spindle bore.

The proposed method of cutting solids of revolution and the tool for carrying said method into effect make it possible to provide approximately the same tool rotation speed when machining the entire workpiece surface which renders it practicable to reduce the force of impact developed when the tool contacts the material being cut and provide for adequacy of the quality and accuracy characteristics of the surface machined, such as the height of microirregularities, the degree and depth of skin-hardening, the amount of residual stresses, etc.

Thus, the proposed method and tool are capable of attaining higher tool endurance and cutting capacity, as well as better quality of surface finish.

Given below is a detailed disclosure of the invention given by way of illustration with reference to an exemplary embodiment thereof shown in the accompanying drawing, wherein a longitudinal section view of a rotary cutting tool for carrying into effect the method of cutting solids of revolution, according to the invention.

The herein-proposed method of cutting solids of revolution by a rotary tool having circular cutting lip, according to the present invention is carried into effect as follows. The workpiece being machined is imparted rotation, while the tool is imparted rectilinear feed motion. Before being brought in contact with the rotating workpiece being machined the tool has been imparted a positive rotation in the same direction as the tool working rotation in the course of cutting at a speed differing by not more than 20 percent from the speed imparted to the tool upon its contacting with the workpiece being machined. When machining workpieces having continuous surface this reduces impact load upon the tool at the initial moment of its contact with the workpiece. Further on the tool rotates by virtue of its interaction with the workpiece being machined.

When machining workpieces having discontinuous surface the tool cutting lip is brought in contact with the revolving workpiece and the tool is imparted rectilinear feed motion, so that the tool receives rotation from the workpiece being machined. As soon as the tool cutting lip comes off the contact with the rotating workpiece which is the case when the tool passes over the slot in the workpiece being machined, the tool is imparted a positive rotation in the aforesaid direction and at the same speed. Then the tool resumes the contact with the workpiece being machined to receive rotation therefrom. Thus, impact load upon the tool when the latter resumes the contact with the workpiece surface upon passing each of the slots is reduced. It is due to the above feature that the invention is most expedient to be applied in machining workpieces having discontinuous surfaces provided with slots arranged either lengthwise or crosswise the workpiece axis, e.g., when machining the rotors of turbines or electrical machines. While passing each of the slots the tool is imparted a positive rotation at the aforesaid speed so that when biting the material the tool would have a speed approximating that resulting from its contact with the workpiece being machined, whereby impact load upon the tool is cut down, chipping and spalling of the tool and workpiece are ruled out, the quality of the workpiece surface finish is improved and the degree of departure from true geometric shape of the workpiece being machined is lessened.

Positive rotation to the tool during its passing over the slots can be imparted due to an increased inertia of the tool spindle journalled in bearings with the housing thereof, by connecting said spindle to an additional mass adapted to be transitorily associated with a rotary-motion drive, such as a motor; thus, the latter imparts rotation to the tool spindle in the same direction and at approximately the same speed transmitted to the tool from the contact with the workpiece being machined, said speed being appropriately predetermined beforehand. Then the cutting process on the workpiece occurs; should the tool speed be found to have dropped by more than 20 percent (upon passing the slot by the tool) due to its possible deceleration, one must either increase the mass or set a higher spindle preacceleration speed which must be determined experimentally for every particular machining conditions.

Said method can be carried into effect through the agency of a rotary tool having a working portion 1 shaped as solid of revolution provided with a cutting lip 2. The working portion 1 is mounted on a spindle 3 accomodated in a housing 5 by means of bearings 4. The spindle 3 has a through bore 6 adapted for a coolant stream to feed therethrough. The bore 6 accommodates a screw-type wind turbine 7 established by a flat helix incorporating at least one complete turn. The lead of helix is adjustable by compressing a tube 8 by means of a nut 9, whereby the tool speed differing from the tool speed imparted by the rotating workpiece by not more than 20 percent is obtained.

The tool according to the invention operates as follows. Prior to bringing the tool in contact with the rotating workpiece coolant is fed to the through bore 6 of the spindle 3. While passing through the wind turbine 7 the stream of coolant sets the spindle 3 carrying the tool working portion 1 in rotation, whereupon the tool is imparted feed motion. Then the tool is brought in contact with the workpiece being machined to start cutting the latter. As the torque resulting from the cutting force is much higher than that developed by the stream of coolant, the tool working portion receives rotation by virtue of interaction with the workpiece. When the tool passes over the slot of the workpiece being machined it is imparted rotation from the turbine 7 at a speed set due to appropriately adjusting the lead of helix so as to approximate to the tool rotation speed resulting from its interaction with the workpiece being machined. That is why the tool, after its having passed over each of the slots, resumes contact with the workpiece surface to bite the material thereof, at a speed close to that imparted thereto due to its contact with the workpiece being machined.

What is claimed is:

1. A rotary tool for carrying into effect a method of cutting solids of revolution, comprising: a working portion shaped as a solid of revolution; a circular cutting lip provided on said working portion; a spindle on which said working portion is set, said spindle having a centre through bore adapted for the stream of coolant to be fed therethrough; a screw-type wind turbine located in said through bore of said spindle and adapted to impart rotation to the tool when the stream of coolant is being fed through said bore.

* * * * *